Figure 1:
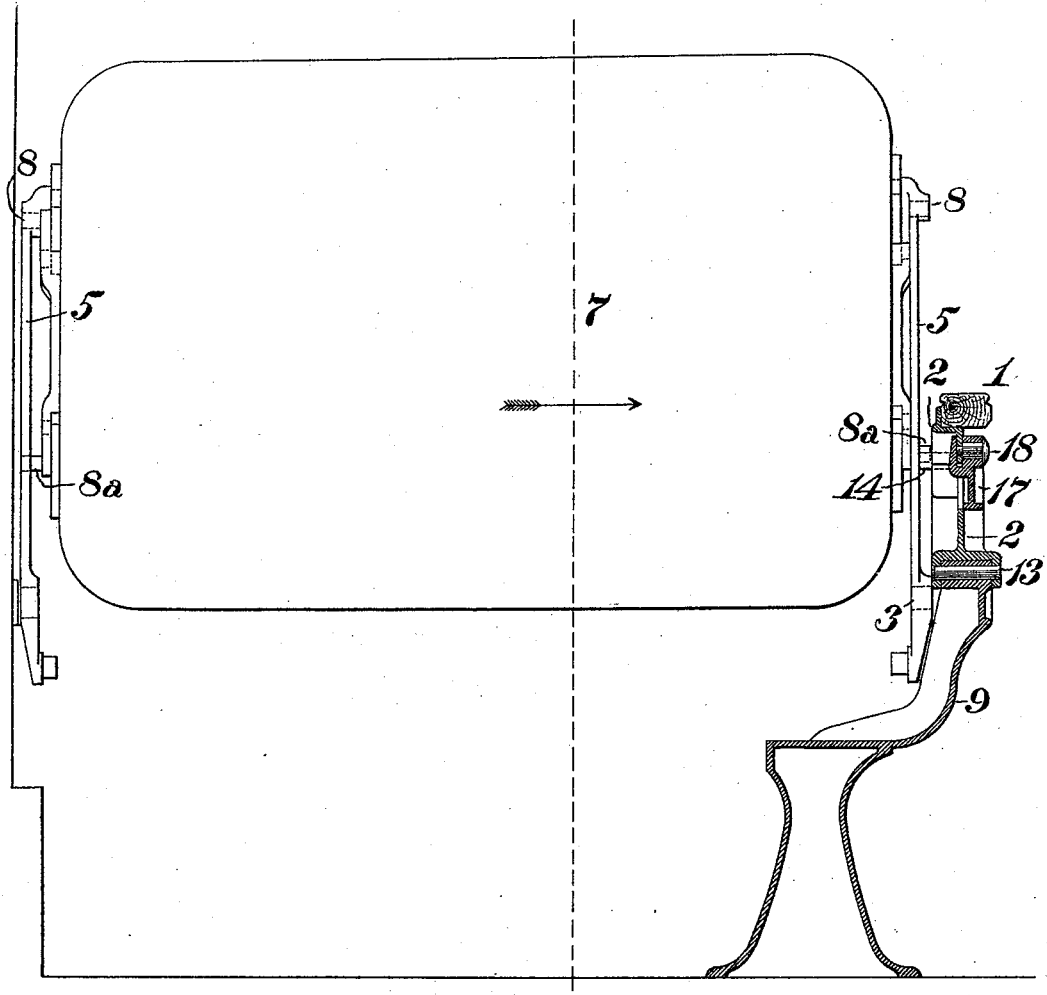

(No Model.) 5 Sheets—Sheet 1.

M. N. FORNEY.
CAR SEAT.

No. 527,842. Patented Oct. 23, 1894.

WITNESSES:
R. N. Whittesey
F. E. Gaither.

INVENTOR,
M. N. Forney,
by Snowden Bell,
Att'y.

(No Model.)  M. N. FORNEY.  5 Sheets—Sheet 3.
CAR SEAT.

No. 527,842.  Patented Oct. 23, 1894.

WITNESSES:  INVENTOR
R H Whittlesey  M. N. Forney,
F. E. Gaither  BY
  J Snowden Bell,
  ATTORNEY (No Model.)  M. N. FORNEY.  5 Sheets—Sheet 4.
CAR SEAT.

No. 527,842.  Patented Oct. 23, 1894.

WITNESSES:  INVENTOR (No Model.)  M. N. FORNEY.  5 Sheets—Sheet 5.
CAR SEAT.
No. 527,842.  Patented Oct. 23, 1894.
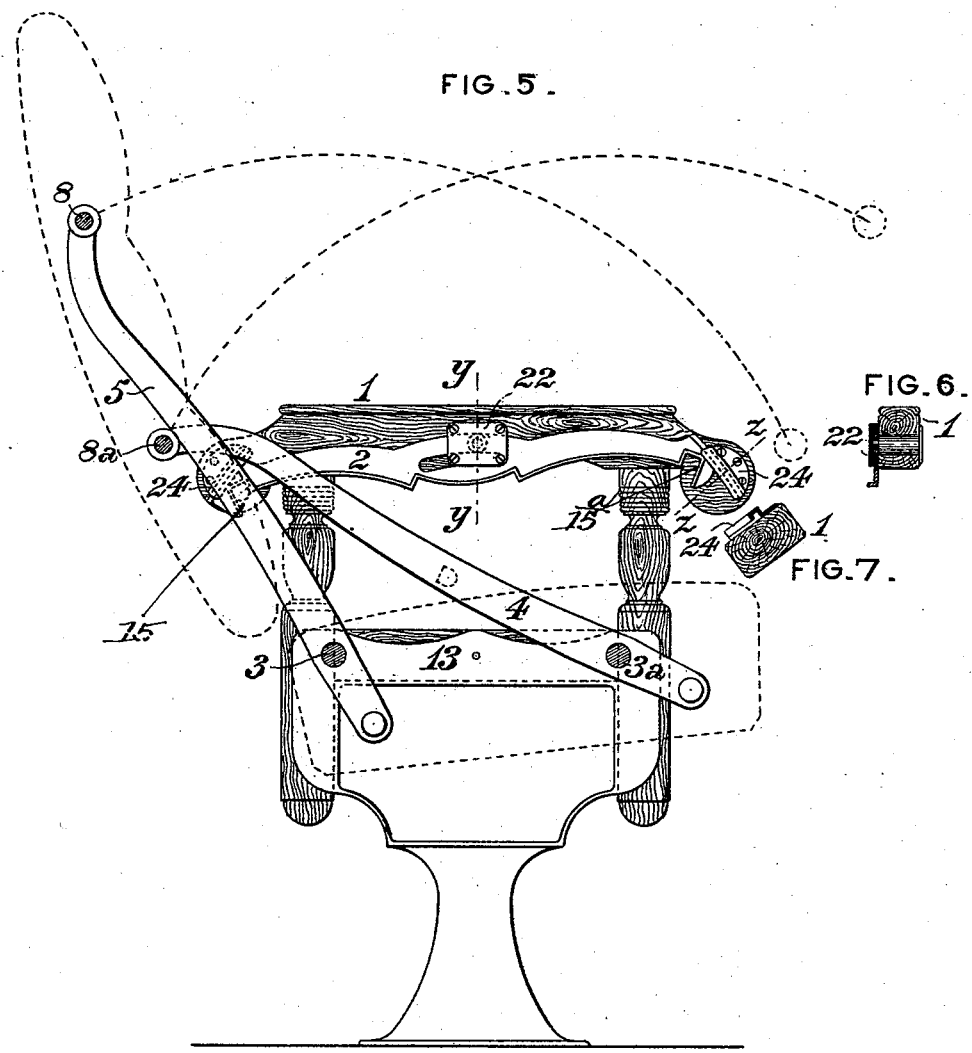
WITNESSES:  INVENTOR

UNITED STATES PATENT OFFICE.

UNITED STATES PATENT OFFICE.

MATTHIAS N. FORNEY, OF NEW YORK, N. Y.

CAR-SEAT.

SPECIFICATION forming part of Letters Patent No. 527,842, dated October 23, 1894.

Application filed December 22, 1892. Serial No. 456,012. (No model.)

*To all whom it may concern:*

Be it known that I, MATTHIAS N. FORNEY, of the city, county, and State of New York, have invented a certain new and useful Improvement in Arm-Rests and Locking Mechanism for Railroad-Car Seats, of which improvement the following is a specification.

My present invention more particularly relates to the general class or type of car seats exemplified in Letters Patent of the United States Nos. 324,825, 360,148, 482,447, and 488,992, granted and issued to me under dates of August 25, 1885, March 29, 1887, September 13, 1892, and January 3, 1893, respectively. My improvement is not, however, limited in application to car seats of such type, and may, without variation of principle, be employed in connection with car seats of other constructions.

The object of the invention is to provide a more convenient and comfortable arm-rest than heretofore, as well as to facilitate the locking of the seat backs in position on either side of the seat, and effect a more secure locking than has been practicable under the ordinary constructions.

To this end, my invention, generally stated, consists in the combination, with a reversing-arm or arms of a seat back, of a movable or vibratory element, centered eccentrically relatively to the reversing-arm or arms, means for engaging said vibratory element with a reversing-arm, in different positions of the seat back, and a lock for maintaining the seat back in either of the two alternative positions of the seat back for use. Said movable or vibratory element may be employed with a fixed arm rest for locking the back in either of its two reversed positions, or may be adapted to serve as a support for a movable arm rest, with or without a lock for securing the back.

The improvement claimed is hereinafter fully set forth.

In car seats of the type set forth in the several Letters Patent before referred to, the reversal of the seat back is effected by means of pairs of crossed reversing-arms or links pivotally connected to the ends of the back and to the seat frame, said arms or links being held in position, on either side of the seats, by locks attached to the end of the arm-rest. This method of locking the back has been found, in practice, to be uncertain, insecure, and difficult to apply, and, moreover, two locks are required for each seat. Under my present invention, one lock only is required, the seat backs are held much more securely, and the arm rest may be inclined backward, by the reversal of the back, which adds to the comfort of the occupant of the seat, at the same time giving more room between the end of the arm-rest and the seat back next in front of it.

Figure 2:
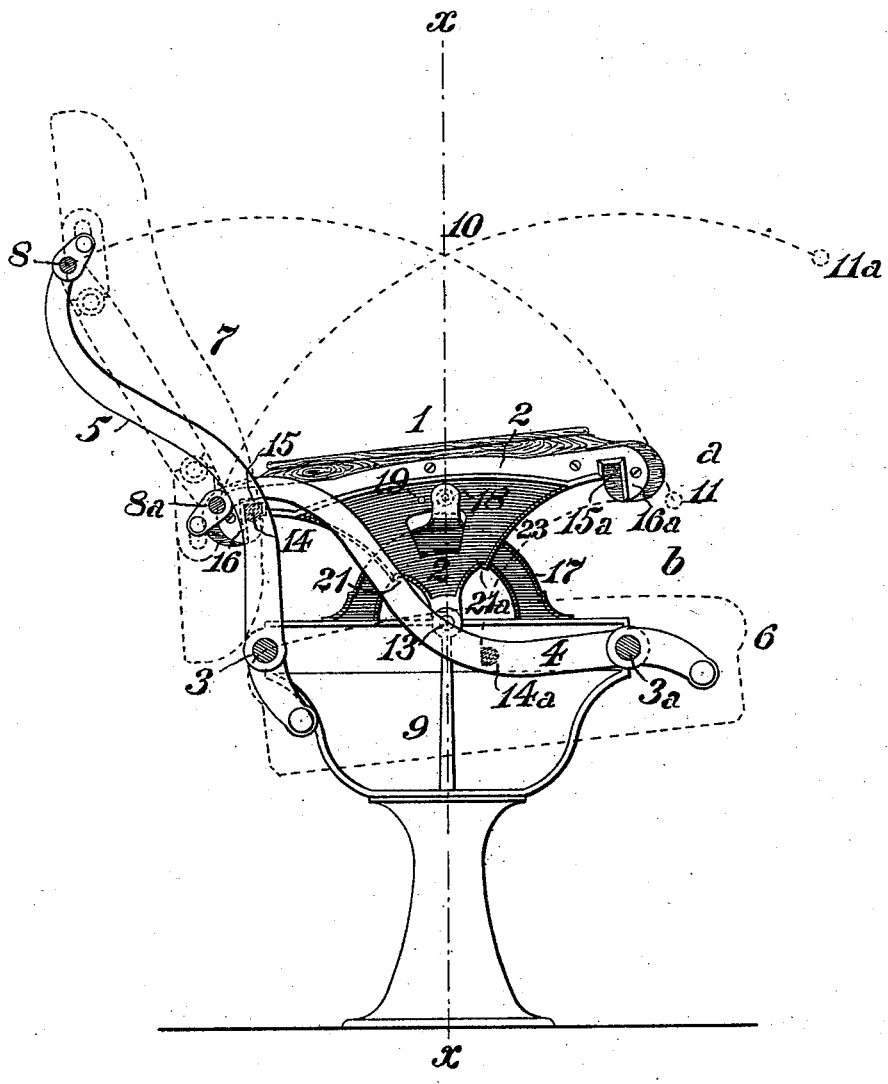
Figure 3:
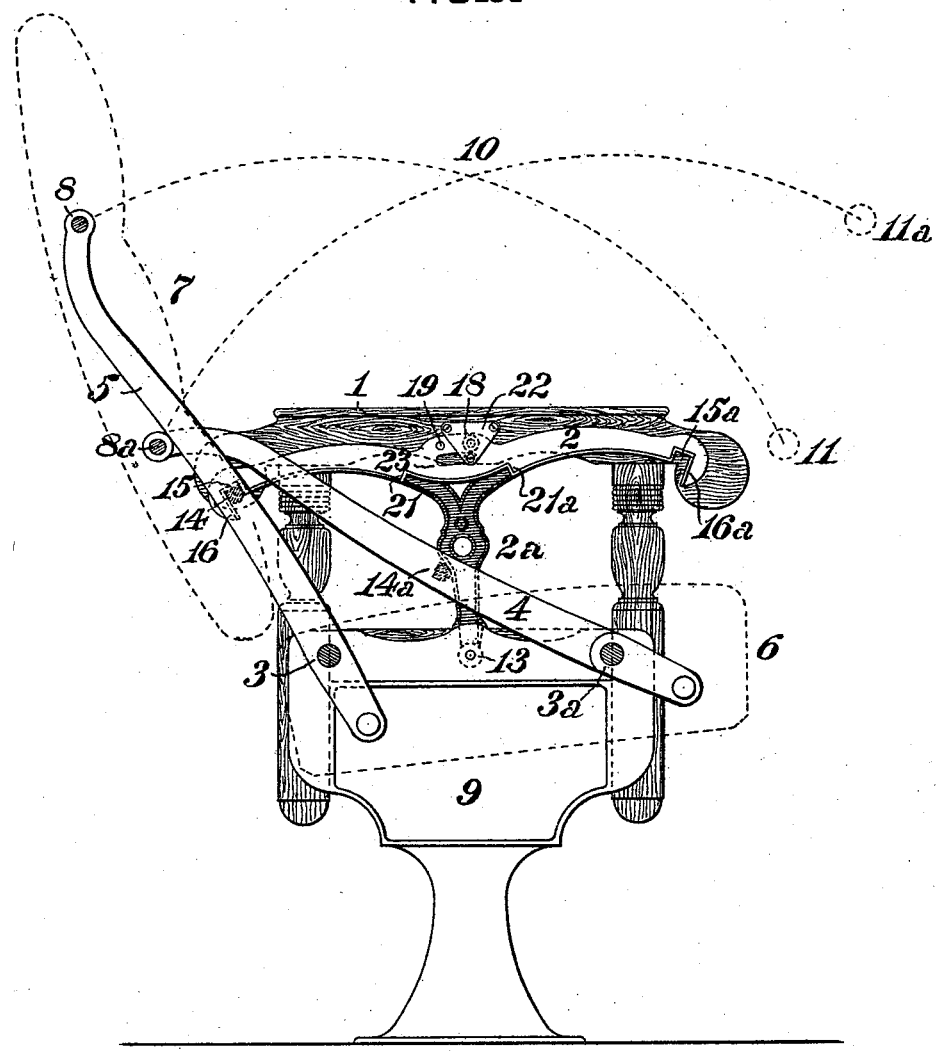
Figure 4:
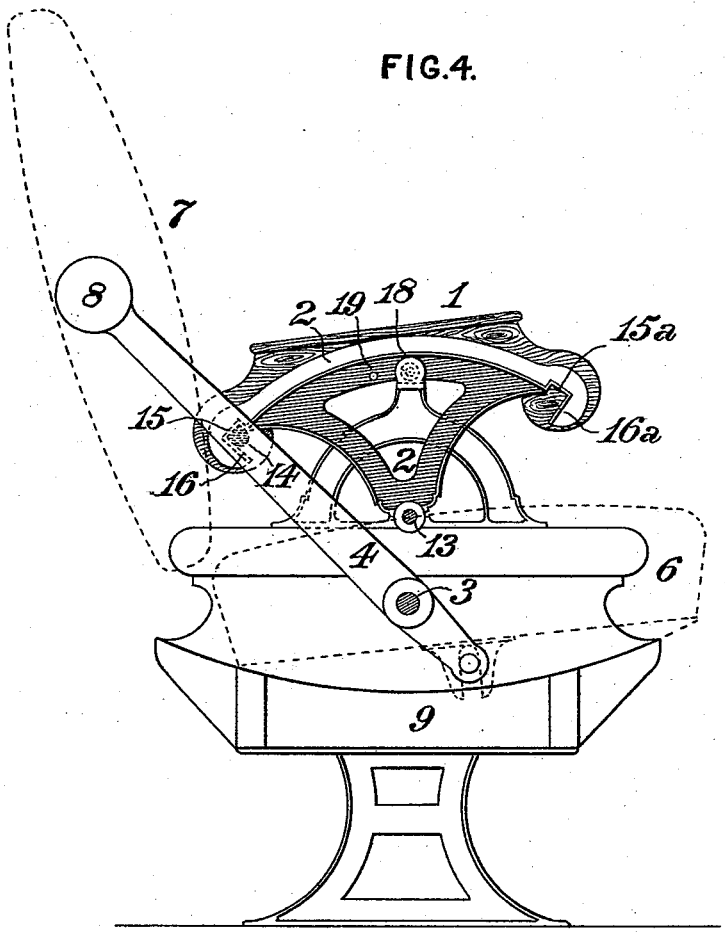

In the accompanying drawings: Figure 1 is a longitudinal section through a car seat illustrating an application of my invention, at the line $x$, $x$, of Fig. 2, the right hand reversing arm, seat frame, and cushion being omitted to avoid complication of lines; Fig. 2, a view, in elevation, of the reversing arms, seat end, and stand, seen from the inner side of the seat end, as indicated by the arrow in Fig. 1, the outlines of the seat back and seat being shown by dotted lines; Fig. 3, a similar view, showing a modification in which the arm-rest is fixed and the vibratory element alone is movable; Fig. 4, a similar view, illustrating the application of my improvement in connection with a seat back reversed by a single arm at each end; Fig. 5, a view illustrating an alternative construction in which the vibratory element is coupled to the seat end by means of slides instead of a pivoted connection, and Figs. 6 and 7, sections taken at the lines $y$, $y$, and $z$, $z$, respectively, of Fig. 5.

The car seat shown in Figs. 1 and 2, is, except as to the embodiment of my present invention, of substantially similar construction to that set forth in my Letters Patent No. 488,992, before referred to, and, so far as the features of said Letters Patent are concerned, need not, therefore, be herein at length described. The reversing-arms 4 and 5 are connected to the seat stand 9, by the fixed pivots $3^a$ and 3, and to the back, 7, by the pivots $8^a$ and 8. In reversing the back, the centers of the latter pivots move in the arcs $8^a$, $10^a$, $11^a$, and 8, 10, 11, respectively.

In the practice of my present invention, I provide, as before noted, a movable or vibrating element 2, whose form resembles that of a letter T, and its point of connection 13, with the seat frame and the points 15 and $15^a$, of engagement with the reversing-arms are at the extremities of the letter T, or are arranged trigonally in relation to each other, or substantially like the angles of an isosceles triangle. For convenience of description this movable or vibratory element will be designated as a T-arm, or locking plate to which the arm-rest 1 may or may not be attached, in the discretion of the constructor. If the arm-rest is attached to the T-arm, the two together form a support for the arms of occupants of the seat. The arm-rest and its supports may, however, be fixed and the T-arm alone be movable, as shown in Fig. 3, except in the particular that it acts as a friction plate, for the reversing arm to bear against. The only purpose the T arm then serves is to lock the two arms in their reversed positions. It may be made of metal, wood, or other material, and is connected, at or near its lower end, to the seat-end or stand 9, by a pivot 13, about which the T-arm 2 is adapted to vibrate, the pivot being eccentric to and at equal distances from the pivots 3, 3ª, of the reversing arms. Notches or recesses 15, 15ª, formed on the lower side of the T-arm 2, near its ends, are adapted, respectively, to be engaged, when the seat back is turned over, by studs or projections 14, 14ª, which are attached to the reversing-arms 4, 5, and project under the T-arm as indicated in Fig. 1. The portion of the surface of the T-arm 2, which is shaded with curved lines in Fig. 2, recedes or stands back from its upper and side portions, as will be seen from the section, Fig. 1. The ends of the T-arm are provided with downward extensions, 16, 16ª, against the inner faces of which the studs 14, 14ª, on the reversing-arms bear, in reversing the seat back 7, and before the latter has been moved to its full limit in either direction.

In turning the seat back from the right to the left side, the stud 14 comes in contact with the extension 16, before the back is completely reversed, and its further movement then causes the T-arm to turn about its pivot 13. The recess 15 consequently moves in an arc of a circle described from the center of the pivot 13, while the stud 14 moves in an arc described from the center of the pivot 3. It will be seen, from the relative location of these two centers, that the stud 14, when it comes in contact with the extension 16, will move in a path which is nearly horizontal, while the left hand end of the T-arm 2, and the extension 16, will move in a downward direction. The downward movement of the T-arm 2, after the stud 14 comes in contact with the extension, consequently causes the stud 14 to be engaged by the recess 15, or, in other words, the recess moves downwardly over the stud, which thus enters it. When this is effected, it is obvious that if the attempt is made to move the seat back toward the right hand side of the seat, that the stud 14 will bear against the shoulder on the right hand side of the recess 15, and, if the T-arm 2 is free to move, that the movement of the seat back and the stud 14, toward the right hand side, will coincidently move the T-arm. If, however, the T-arm be fastened, so as to be precluded from moving from the position in which it is shown in Fig. 2, the shoulder on the right hand side of the recess 15 will hold the stud 14 and arm 5, and prevent the back from being turned over to the right hand side of the seat.

For the purpose of locking or fastening the T-arms, so as to hold the seat back in either of its two opposite positions, an upward extension 17 is attached to the seat stand 9, said extension having a forked ended top, which receives the T-arm, and being provided with an ordinary seat lock 18. Indicated by dotted circles in Fig. 2. A hole, indicated by the smaller dotted circle, is drilled in the T-arm to receive the bolt of the lock when the T-arm is in the position shown in Fig. 2. When the bolt enters said hole, the T-arm will be securely held in position, the shoulder on the right hand side of the recess 15, then preventing any movement of the stud 14 or of the reversing-arm 5, and the seat back will be securely locked in the position in which it is shown.

To reverse the position of the seat back, the bolt of the lock is withdrawn from the hole in the T-arm, and the seat back can then be moved toward the right, the stud 14 coming in contact with the shoulder on the right side of the recess 15, and moving the T-arm until the shoulder is out of contact with the stud. After such interruption of contact, the T-arm will not be moved farther by the movement of the seat back, until the stud 14ª, of the arm 4, which stud, in the reversal of the back, moves in the arc 14ª, 15ª, comes in contact with the downward extension 16ª, at the right hand end of the T-arm. The action of said stud and of the T-arm will then be precisely similar, but in reversed direction, to that resultant upon the contact of the stud 14 with the downward projection 16, as before described. A hole 19, in the T-arm, opposite to the bolt of the lock when the seat back and T-arm are in their reversed positions on the right hand side of the seat, enables the seat back to be locked in such position by the entrance of the lock bolt into the hole.

Under the construction above described, it will be seen that only one lock is required, and that the backward movement of the arm-rest 1, in the reversal of the seat back, affords greater space at *a*, between the front end of the arm-rest and the seat back next in front of it, than there would be if the arm-rest was fixed. A clear space is also left at *b*, between the lower side of the end of the arm-rest and the seat 6, which gives room for the clothing of the occupants of the seat. The arm-rest also has a backward inclination in each position of the seat back, which adds to the comfort of an occupant of the seat. This form of arm-rest may be used with or without a lock. While, as before explained, it facilitates the locking of the seat backs, if used without a lock it has all the advantages recited except that of locking the back.

If, when the seat back is on the left hand side of the seat, as shown in Fig. 2, the bolt of the lock should be withdrawn from the hole at 18, and the seat back should be moved toward the right, until the stud 14 is disengaged from the right hand shoulder of the recess 15, and the arm-rest and T-arm should then be inadvertently pushed over toward the right hand side, far enough to permit the bolt of the lock to enter the hole 19, the T-arm would then be locked in the position it should occupy when the seat back is turned into its reversed position on the right hand side of the seat. In such case, if the seat back was turned still further, and if the stud 14ª should be able to move below the right hand curved portion 23 of the T-arm, it will be obvious that this curved surface would then be eccentric to the path of the stud 14ª, which path is indicated, in Fig. 2, by the dotted line 14ª, 15ª, and that the action of the stud against the curved surface of the T-arm would be analogous to that which would result if the stud moved in contact with a plane inclined to its path. The stud 14ª, would consequently exert a kind of wedging action against the curved surface of the T-arm, by which the force applied to move the seat back would be multiplied in the upward pressure exerted by the stud upon the curved surface. Owing to the great leverage which could thus be exerted, if no means were provided for preventing the stud from passing under the curved part of the T-arm, when it happened to be locked in reverse position to the seat back, there would be great liability to breakage of either the stud, the lock, or the T-arm, in the event of undue force being exerted in the effort to turn the seat back. In order to obviate this objectionable liability, safety-stops or shoulders 21, 21ª, are formed on the T-arm, one on each of its curved sides, a short distance above its lower pivot. The position of said safety-stops, relatively to the studs of the reversing arms, is such that in case the T-arm should be locked in its right hand position when the seat back is on the left side of the seat, the stud 14ª will come in contact with the safety stop 21ª, when the seat back is turned about half way over. It will then be impossible to turn the seat back any further, without first unlocking the T-arm and moving it toward the left side. If it should be moved toward the right side, but not far enough to cause the stud 14ª to engage with the safety stop 21ª, and if the stud should pass below the right hand curved portion of the T-arm, the latter would come in contact with the stud, and it will then be impossible to move the T-arm far enough to the right to permit the bolt of the lock to enter the hole 19. The T-arm is therefore free to move and strain will not be brought on it by the action of the stud. This safety guard is important for preventing the breakage of the locking device by careless handling, and its employment fully obviates risk of such damage.

Fig. 3 illustrates a modification in which the arm-rest 1 is fixed, and is of the ordinary form. The T-arm 2 is of the same general T form as before described, and is provided with end recesses 15, 15ª, and downward projections 16, 16ª, at top, and with a lower extension 2ª and pivot 13, by which it is coupled to the seat stand 9, these members being located relatively one to another, and to the pivots 3ª, 3, of the reversing arms, 4, 5, as in the instance first described. The seat back shown in Fig. 2 is of the flexible construction set forth in my Letters Patent No. 488,992, before referred to, while that of Fig. 3 is a rigid back, of the construction heretofore employed, and as set forth in my Letters Patent Nos. 324,825 and 360,148. The differences in the construction and action of these two forms of seat backs require different shapes and proportions for the reversing-arms and their pivotal connections, and consequently different proportions are adopted in the T-arm 2 of Fig. 3. The action of said T-arm is, however, similar to that shown in Figs. 1 and 2. Instead, however, of being held at top in a forked bearing, as in said figures, the T-arm 2 is, in this instance, connected to the fixed arm-rest 1, by a plate 22, secured at top to the arm rest, and having on its lower end a boss which fits freely in a slot 23 in the T-arm. Safety-stops 21, 21ª, similar to those of Fig. 2, are also provided for the same purpose as those previously described.

The modification shown in Fig. 4 is one adapted for use with a seat which is operated by a single reversing-arm 4. The T-arm 2 is, as in the preceding instances, mounted upon the seat stand eccentrically to the reversing-arm, being journaled on and movable about a lower pivot 13, and is provided at top with end recesses 15, 15ª, and downward extensions 16, 16ª, similar to those before described, and adapted to similarly operate in connection with a stud or projection 14 on the reversing arm 4. The arm rest 1 is, in this case, secured to and movable with the T-arm, as in Figs. 1 and 2.

The leading and essential feature of my invention is a movable element or T-arm, whose center of motion is eccentric to the pivot or pivots of a reversing-arm or arms, and which is provided with means for engagement with, and movement by, a reversing arm, in either direction of reversal of a seat back coupled thereto. Said movable T-arm may be applied either with or without a lock for securing the seat back in either of its two opposite positions, and where a lock is employed, safety-stops, for engagement with a reversing-arm, are provided to prevent the imposition of undue strains upon the locking mechanism. The T-arms are preferably, as shown, centered by pivotal connections, but sliding or other attachments admitting of the requisite movement of the T-arms may be equivalently employed, as exemplified in Figs. 5, 6, and 7, in which the locking plate 2 is shown as held to the seat arm by slides 22, 24, 24, in which it is adapted to move easily. The contour lines of said slides are drawn from the center 13, the location of which is the same as that of the T arm in Fig. 3. The locking plate 2, in Fig. 5, is therefore constrained to move in the same path as that of the T arm of Fig. 3, that is to say, it turns about the center 13. The forms of the slides 22 and 24 are shown by the sections Figs. 6 and 7.

In the several instances illustrated, the T-arms are provided with notches or recesses, and the reversing-arms with studs or projections for engagement therewith, but the relative positions of these devices may, if desired, be transposed, without variation of operative principle, that is to say, the recesses may be formed upon the reversing-arms and the projections upon the T-arms. The T-arm may, as shown, be employed with either a fixed or a movable arm-rest, and with reversing arms of constructions other than those shown in the drawings.

The T-arms are preferably made of metal with wooden arm-rests attached to them, as shown in Figs. 1 and 2, but the arm-rest and T-arm may both be made in one piece, and of wood, as shown in Fig. 4, or of metal or of other material. I do not therefore desire to limit myself to the specific construction of movable T-arm herein set forth, nor to its application in connection with a specific reversing mechanism, as, in these regards, sundry modifications may be made without departure from the governing structural and operative principle of my invention.

I claim as my invention and desire to secure by Letters Patent—

1. The combination, substantially as set forth, of a seat with a reversible back, reversing arms pivotally connected to a seat end or frame and connected to the back, an arm rest, a T arm or locking plate which is coupled to the seat end or supporting frame and is adapted to move independently thereof and of the seat, engaging devices formed on the reversing arm or arms, and corresponding devices formed on the T arm or locking plate, whereby the movement of the latter is effected in and by that of the former when the back is reversed.

2. The combination, substantially as set forth, of a car seat, a reversible back, reversing-arms pivotally connected to the seat-end or frame and connected to the back, an arm rest, a movable T-arm having its center of motion eccentric to those of the reversing-arms, and engaging devices on the reversing and T-arms whereby the movement of the latter and of the arm rest is effected in and by that of the former when the back is reversed.

3. The combination, substantially as set forth, of a car-seat, a reversible back, reversing-arms pivotally connected to the seat-end or frame and connected to the back, an arm rest, a movable T-arm having its center of motion eccentric to those of the reversing-arms, and engaging devices on the reversing and T-arms, those on the T-arm being arranged trigonally to the center of its motion, and adapted to engage with corresponding devices on the reversing-arms in and by their movement when the back is reversed.

4. The combination, substantially as set forth, of a seat with a reversible back, reversing arms pivotally connected to the seat end or frame and connected to the back, a T arm or locking plate movably connected to the seat end or supporting frame, and adapted to move independently thereof and of the seat, engaging devices formed on the reversing arm or arms, and corresponding devices formed on the T arm or locking plate, and a lock whereby the T arm or locking plate and the back are secured in their reversed positions.

5. The combination, substantially as set forth, of a car-seat, a reversible back, reversing-arms pivotally connected to the seat-end or frame and connected to the back, a movable T-arm having its center of motion eccentric to those of the reversing-arms, engaging devices on the reversing and T-arms whereby the movement of the latter is effected in and by that of the former when the back is reversed, a lock whereby the T-arm and seat-back are secured in their respective positions on either side of the seat, and an extension attached to the seat-end or frame and forming a support or bearing for the T-arm or lock, or both.

6. The combination, substantially as set forth, of a car-seat with a reversible back, reversing-arms pivotally connected to the seat-end or frame and connected to the back, a movable T-arm having its center of motion eccentric to those of the reversing-arms, downward projections formed on the ends of the T-arm, each forming the outer boundary of a recess therein, and studs or projections on the reversing-arms adapted to bear against the said projections and engage in the recesses in the reversal of the back.

7. The combination, substantially as set forth, of a car-seat, a reversible back, reversing-arms pivotally connected to the seat-end or frame and connected to the back, a movable T-arm having its center of motion eccentric to those of the reversing-arms, downward projections or shoulders formed on the ends of the T-arm, each forming the outer boundary of a recess therein, studs or projections on the reversing-arms adapted to engage in the recesses and bear against the adjoining projections in the reversal of the seat-back, and a lock arranged to secure the T-arm and seat-back in either of their reversed positions.

8. The combination, substantially as set forth, of a car-seat, a reversible back, reversing-arms pivotally connected to the seat-end or frame and connected to the back, a movable T-arm having its center of motion eccentric to those of the reversing-arms, shoulders or projections formed on the ends of the T-arm, each forming the inner boundary of a recess therein, studs or projections on the reversing arms, each adapted to engage in the recesses and bear against the said projections or shoulders, and a lock arranged to secure the T-arm and seat-back in either of their positions when in use.

MATTHIAS N. FORNEY.

Witnesses:
FRANK J. FRENCH,
LENA F. VANNER.